May 15, 1934.                    D. E. PRIEST                    1,959,218
                              COPING SAW FRAME
                            Filed Feb. 13, 1933
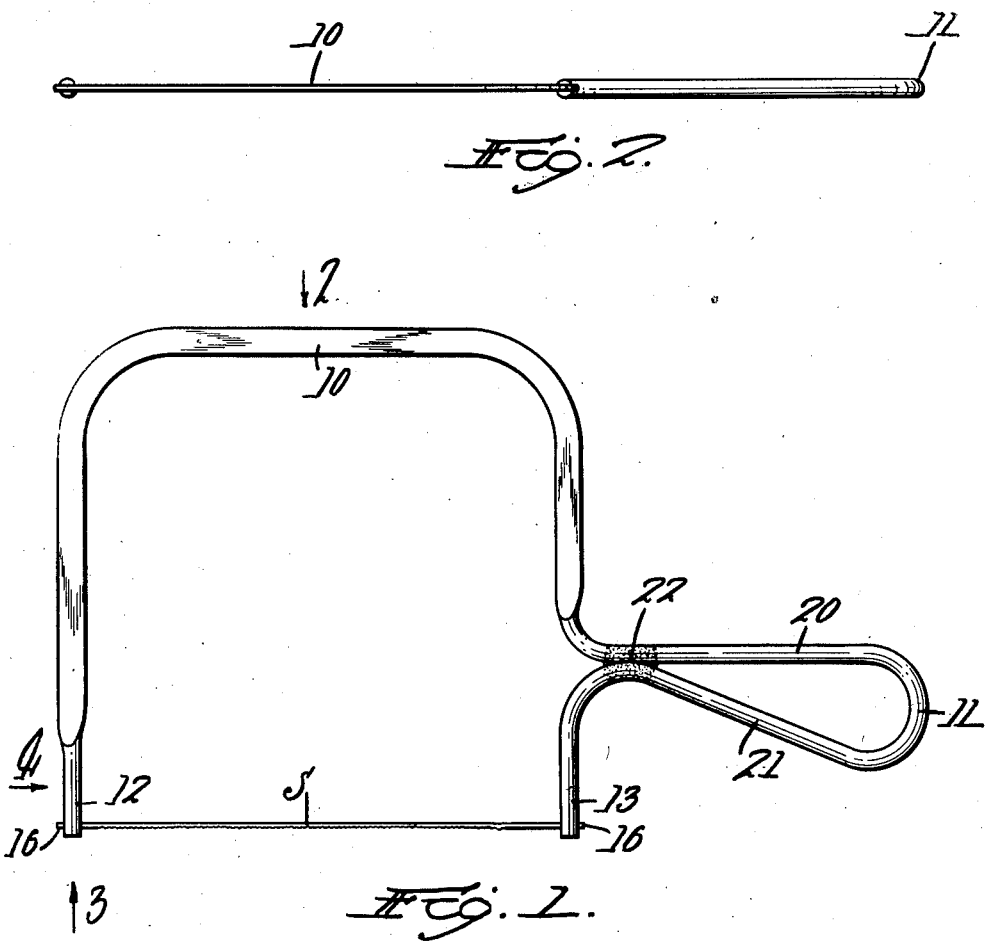
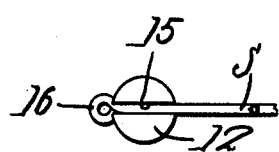
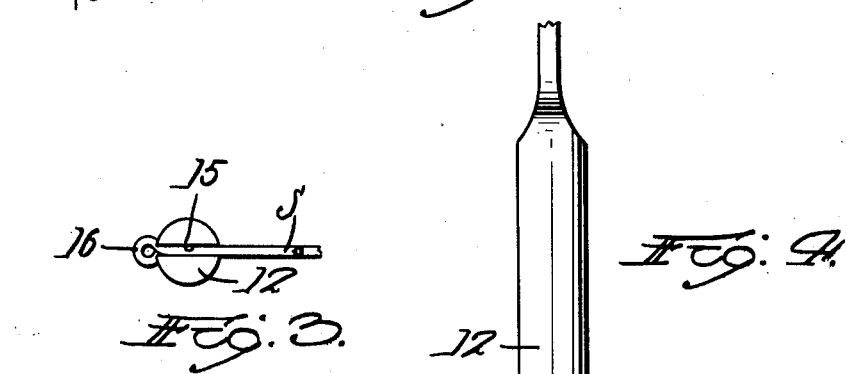
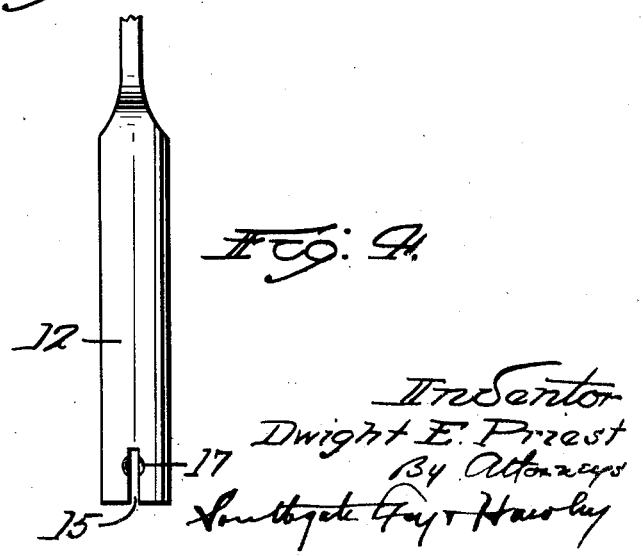

Patented May 15, 1934

1,959,218

UNITED STATES PATENT OFFICE 1,959,218

COPING SAW FRAME

Dwight E. Priest, Worcester, Mass., assignor to Parker Wire Goods Company, Worcester, Mass., a corporation of Massachusetts Application February 13, 1933, Serial No. 656,523

1 Claim. (Cl. 145—33)

This invention relates to frames for coping saws, it being the general object of my invention to provide an improved construction of coping saw frame in which the cost of material is reduced, while the strength and stiffness of the frame is substantially increased.

A further object is to provide a frame which is made from a single piece of round wire rod but having portions thereof transformed to a flattened cross section in the process of making the frame, whereby the strength and stiffness of the frame is substantially increased.

My invention further relates to arrangements and combinations of parts which will be hereinafter described and more particularly pointed out in the appended claim.

A preferred form of the invention is shown in the drawing, in which

Fig. 1 is a side elevation of my improved coping saw frame;

Fig. 2 is a plan view thereof, looking in the direction of the arrow 2 in Fig. 1, and Figs. 3 and 4 are enlarged detail views, looking in the directions of the arrows 3 and 4 respectively in Fig. 1.

Referring to the drawing, I have shown a coping saw frame formed from a single piece of round wire rod and comprising a U-shaped saw-holding portion 10 and a handle portion 11. The ends 12 and 13 of the frame are preferably slotted, as indicated at 15 (Fig. 4), to receive a coping saw S of a usual commercial type having its ends bent to circular form, as indicated at 16 (Fig. 3). The ends 12 and 13 of the saw frame are also preferably countersunk or recessed, as shown at 17 (Fig. 4), to receive the rounded ends 16 of the saw S.

The handle portion 11 is preferably formed from a single continuous loop of the round wire rod from which the frame is formed. One side 20 of the loop preferably extends substantially perpendicular to the adjacent side of the saw-holding frame 10, while the other side 21 is disposed at an oblique angle thereto.

The sides 20 and 21 of the loop 11 are also preferably permanently secured together at the point 22 in any convenient manner, as by welding. The rigidity of the handle and the stiffness of the entire frame is substantially increased by thus rigidly securing the parts of the loop together at the point 22.

I also preferably further increase the strength and stiffness of the frame by transforming a part of the round wire rod to flattened condition, as indicated in Figs. 1 and 3, this flattening operation being performed after the saw holding portion 10 has been bent to U-shaped form.

The flattening may be performed in any convenient manner, as by a press operation, and it is found that a wire frame thus flattened after being bent to final form possesses exceptional strength and stiffness, permitting me to use a smaller size of wire rod, which in turn reduces the cost of the material.

It is also much more desirable that the handle portion 11 be of round wire instead of flattened wire, as a more comfortable grip is thus secured.

Having thus described my invention and the advantages thereof, I do not wish to be limited to the details herein disclosed otherwise than as set forth in the claim, but what I claim is:—

A one-piece wire rod coping saw frame having slotted saw-supporting end portions of round cross section, a substantially U-shaped body portion, a handle loop of round cross section connecting one of said end portions to said body portion, the two sides of said loop abutting and permanently secured together adjacent said body portion, said body portion being positioned between one end portion and said handle loop and having a cross sectional area substantially equal to the cross section of one of said end portions but being substantially broader in the plane of the frame and substantially thinner in a direction perpendicular to said plane than said end portion.

DWIGHT E. PRIEST.